May 23, 1939.　　　　　P. MARÉCAUX　　　　2,159,281
METHOD AND PLANT FOR THE HYDROGENATION OF CARBONACEOUS
SUBSTANCES CONTAINING SULPHUR
Filed May 26, 1936　　　2 Sheets-Sheet 2
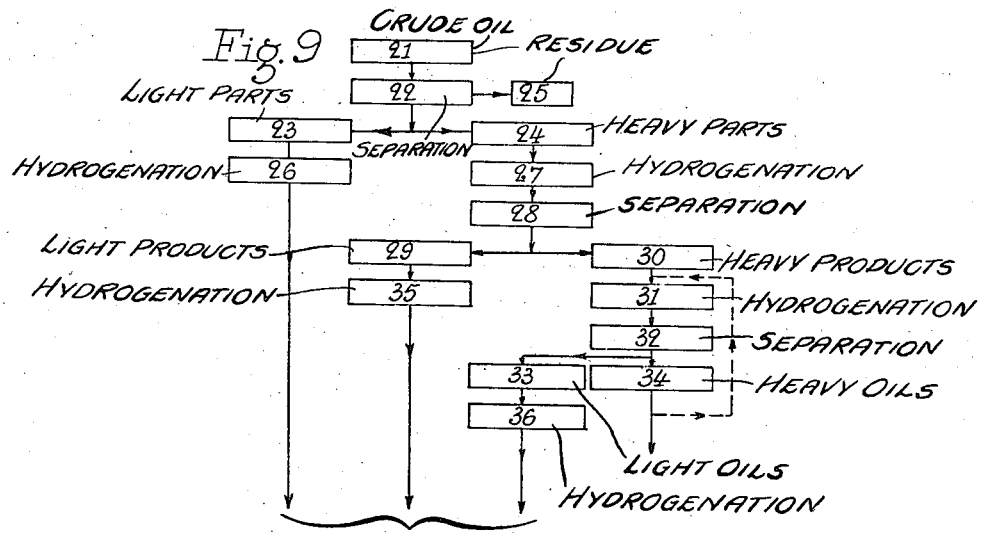
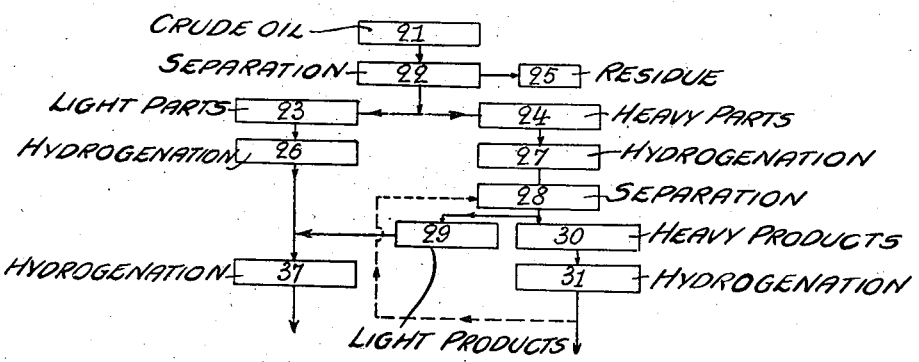
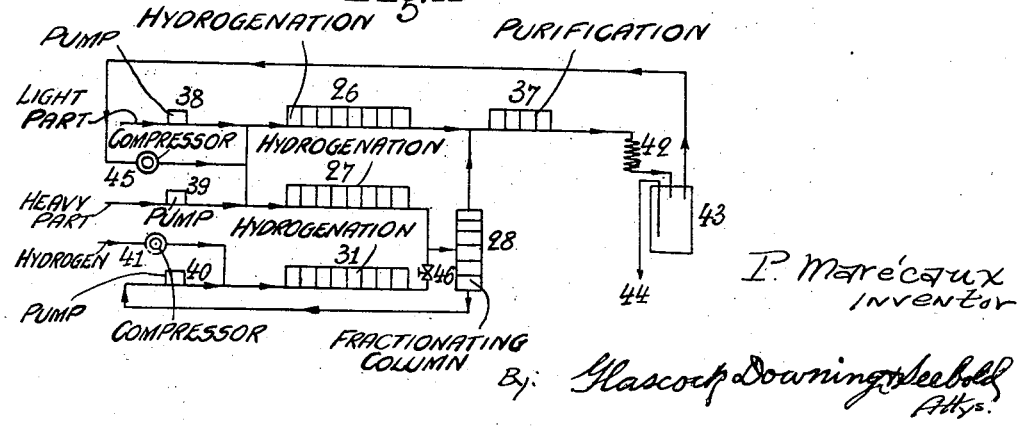
P. Marécaux
INVENTOR Patented May 23, 1939

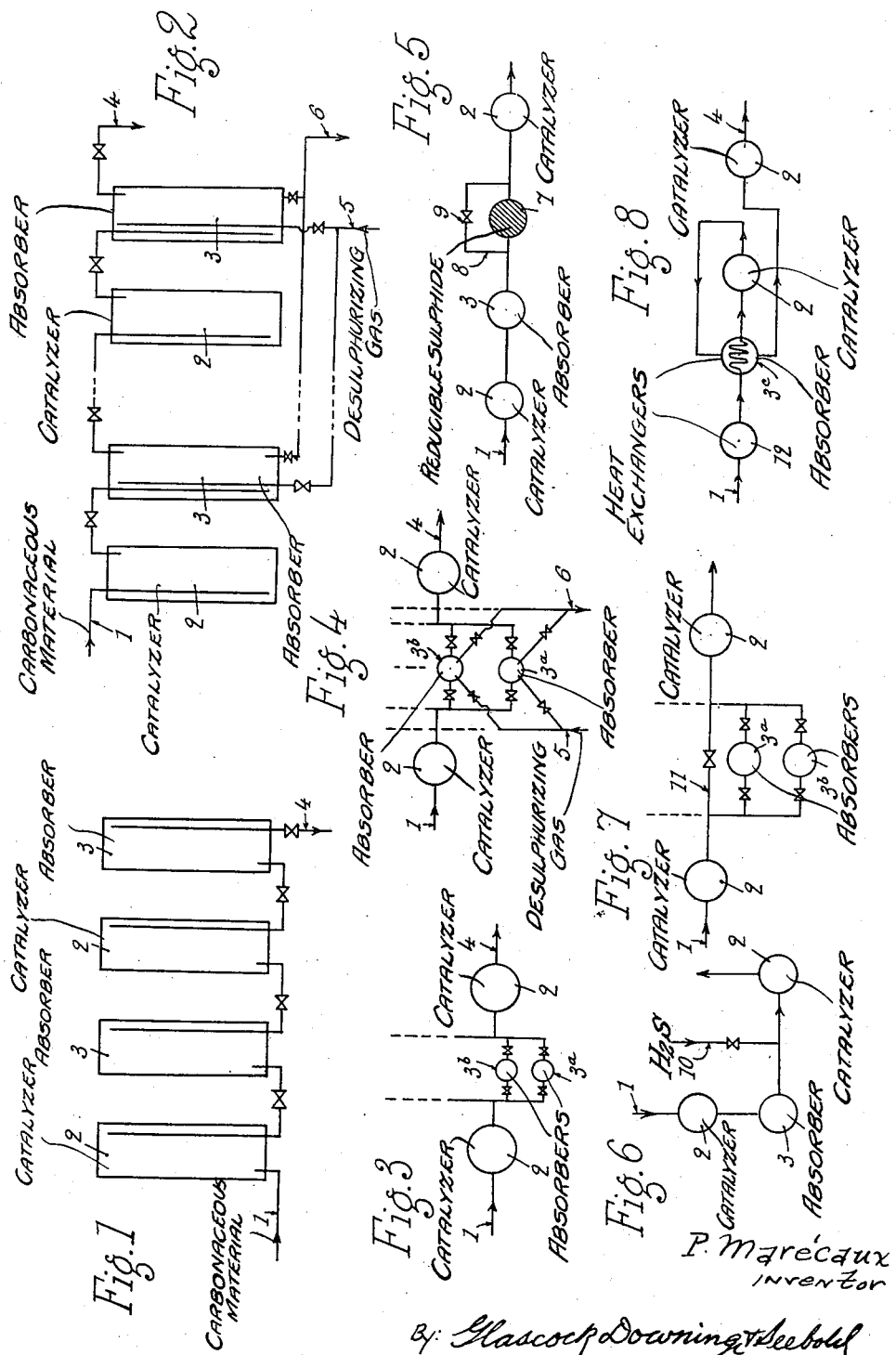

2,159,281

UNITED STATES PATENT OFFICE 2,159,281

METHOD AND PLANT FOR THE HYDROGENATION OF CARBONACEOUS SUBSTANCES CONTAINING SULPHUR

Paul Marécaux, Nancy, France

Application May 26, 1936, Serial No. 81,972
In France May 31, 1935

1 Claim. (Cl. 196—53)

The present invention has for its object a method and a plant for the hydrogenation of carbonaceous substances containing sulphur in the combined state, thus producing hydrocarbons (gaseous and liquid fuels, lubricating oils, greases, etc.).

It is a known fact that numerous carbonaceous substances which serve as raw material for the preparation of hydrocarbons adapted for industrial use, contain combined sulphur, which may have a natural origin (schist-oils, petroleum residues, coal oils), or which may be introduced during previous operations.

The transformation of carbonaceous substances into hydrocarbons by hydrogenation takes place in the presence of catalysts, but it is a known fact that only a small number of substances can be used as catalysts for the hydrogenation of carbonaceous substances containing sulphur. Those which are best known are based upon compounds of molybdenum, tungsten or cobalt. The other catalysts used for hydrogenation (such as reduced nickel, iron, or platinum) are either rapidly put out of use, or at least show an activity which is reduced in great proportions when the substances under treatment contain sulphur, often even in infinitesimal traces.

However, even the catalysts based upon molybdenum, tungsten or cobalt appear to show a greatly reduced activity when the substances under treatment contain sulphur in proportions exceeding 0.5%. This is due to the fact that the hydrogenation of the sulphuretted substances, by means of the surface parts of the catalysts, disengages hydrogen sulphide, which acts against the operation of the inner parts of the catalyst, and may even prevent this altogether.

The total activity of a given quantity of catalyst will thus be greatly reduced.

One of the essential features of the method according to the invention consists in the elimination of the hydrogen sulphide as fast as it is formed, at least at the points of the apparatus at which its proportion prevents the proper working of the inner parts of the catalyst.

However, the presence of a small proportion of hydrogen sulphide in the reacting gases (in general, from 0.1 to 1%) ensures a better preservation of the catalysts and furthers their operation; it is thus possible, in the aforesaid method, although it is not indispensable, to take means to bring in all cases the proportion of hydrogen sulphide to the optimum catalyst activating value.

The elimination of the hydrogen sulphide from the region of the catalysts can be effected physically (for instance by a selective adsorption of $H_2S$) or chemically, by means of substances (metals, oxides, metallic salts or sulphides) adapted to fix the sulphur of the hydrogen sulphide, such substances being mixed with the catalysing substance itself, and placed in the same chamber, or placed in separate chambers which alternate with the chambers.

Among the oxides, the following may be employed: lime, magnesia, baryta, oxides of iron, of manganese, of copper, of zinc, of chromium, of nickel, of cobalt, of sodium, of potassium, of aluminium, of lead. As salts, the following may be used: the natural carbonates and silicates of these metals, or earths containing these metals or oxides. As sulphides, it is feasible to employ the sub-sulphides of copper, antimony, bismuth, manganese, nickel, cobalt. The following metals can be employed: iron, nickel, copper, cobalt, manganese, antimony, tin, zinc, aluminium, lead, or alloys of two or more of these metals used together, or cast iron, steel, etc.

These metals are preferably employed in the divided state, such as power, wire-gauze, turnings, or scrap. The metals and the sub-sulphides have the advantage of disengaging the hydrogen combined with the sulphur in the hydrogen sulphide, of not introducing any foreign substance into the operation (water vapour in the case of the oxides,) and of furthering the action of the catalysts, by increasing the partial pressure of the hydrogen (by the restitution of this latter as above mentioned), by supplying nascent hydrogen adapted to react in its turn, and by producing a commencement of cracking which furthers a subsequent hydrogenation.

This absorption of the hydrogen sulphide has also the advantage of avoiding the presence of hydrogen sulphide in the general plant and in the condensed products. It may be utilized as a source of heat.

When the absorbent substances employed are adapted to be renewed after their saturation, their desulphurisation will be effected by means of steam, water-gas, residual hydrogen, air or oxygen.

A suitable catalyst which can be used in the said method consists of active carbon which retains, by adsorption, the particles of a colloidal precipitate of molybdic, tungstic or vanadic acid.

The preparation of said catalyst is based upon the following action. If one treats molybdate of ammonium, for instance, with nitric acid, there will be set free molybdic acid, and this, when redissolved in an excess of nitric acid, will then be in a state of colloidal solution, which is rendered unstable by the strong final acidity. It will result that the "molybdic" colloid which at the time when it was dissolved afforded a solution which was clear, even though colloidal, will increase in size, will make the solution turbid, and will finally be deposited, and the size attained by the particles of the colloid will then in fact be incompatible with its maintenance in colloidal dispersion.

If into the colloidal solution which is newly prepared, or only a certain time after its preparation, active carbon is introduced, it is found that this latter will at once adsorb a small quantity of colloid, which appears to be equally distributed throughout the whole mass of the adsorbent. As the colloid increases in size, it can no longer penetrate except into the minute channels of larger size, that is to say, the ones at the periphery of the active carbon.

Finally, an active carbon is obtained, in which the catalyzing element is especially distributed near the surface of the grains, although the interior of these latter also contains the element, owing to the small original adsorption. By varying the conditions of flocculation of the catalyst (and in particular controlling the temperature and the proportion of molybdic and nitric acids), and the time during the "life" of the colloid at which the active carbon is introduced, a whole series of catalysts may be prepared whose active parts will be differently situated.

The above-described method of preparation, which places the major part of the catalyst in the region of the supporting substance which is the most accessible to vapours, will finally afford a catalyst for hydrogenation which is quite effective and which well resists deterioration by deposits of carbon. This method also has the advantage of not overloading the carbon with molybdic acid, and of thus facilitating the capillary exchanges due to the adsorbent supporting substance. Due to the small quantity of molybdic acid which is necessary, the catalyst is very economical.

The method of hydrogenation according to the invention may be carried out by acting on the carbonaceous material either by hydrogen or by hydrogen supplying gases, at atmospheric pressure or under pressure, and at variable temperatures.

The use of a pressure is preferred, as it reduces the temperature required and the time of contact necessary for performing the reactions, it extends the hydrogenation to a larger part of the products treated, and it furthers the production of light products. However, pressure is not indispensable, and the process can be used with pressures between that of the absolute atmosphere, up to 300 atmospheres and over.

The temperature of the reaction chambers may vary from 200° to 600° and more. It depends upon a certain number of factors, among which may be mentioned: the nature and the state of wear of the catalyzing substances, the nature of the products treated (proportion of sulphur or other impurities, chemical composition, limits of ebullition, etc.), the nature of the products to be obtained (amount of residual impurities, density, limits of ebullition, chemical composition), the pressure at which the cycle of operations takes place, the partial pressure of the hydrogen in the vapours, the output of treated products with reference to the volume of the catalyst, etc. The temperature of the various points of the apparatus may be different; it will advantageously increase from the first catalysis tube to the last.

The aforesaid process can be applied quite as well to the hydrogenation in the liquid state, as to the hydrogenation in the vapour state.

In the liquid state, the absorbent masses will be placed in the liquid or in the vapours.

In the vapour state, the method can be applied in different ways. The general principle consists in circulating the reacting vapours alternately upon the catalyst itself, and upon the absorbing masses. As the hydrogenation proceeds, the content in hydrogen sulphide increases in the products which are treated. When said content has reached a critical value below which it is not prejudicial to the catalysts but above which it is prejudicial to the same, it is necessary to reduce the hydrogen sulphide content. The successive partial hydrogenations are performed in such manner that at the end of each partial hydrogenation, the hydrogen sulphide content never exceeds said critical content.

The desulphurizing hydrogenation, i. e. the hydrogenation combined with the elimination of the hydrogen sulphide produced, as above explained, enables the catalysts to assume such a great activity that the usual conditions required for the hydrogenation may be greatly improved. Therefore, according to the present invention, the hydrogenation of carbonaceous material which is rich in sulphur may comprise the following steps:

Separating the crude oil to be treated, into several fractional parts which are heavy and light,

Effecting a desulphurizing hydrogenation of all such fractional parts, separately, and at low pressure, Separating the treated substances into other fractional parts which are heavy and light (which latter corresponds, as to limits of ebullition, to the final product to be obtained), Again hydrogenating, with desulphurization, the heavy fractional parts at high pressure, one or two times, in order to entirely complete their transformation into light oil which was commenced at low pressure, a separation into heavy and light fractional parts preceding each further hydrogenation, And lastly, purifying simultaneously the different separated light fractional parts, and preferably by a final desulphurizing hydrogenation.

In the accompanying drawings, which are given solely by way of example:

Figures 1 to 8 show diagrammatically different embodiments for the execution of a desulphurizing hydrogenation.

Figs. 9 and 10 are diagrammatic views showing the different steps of a hydrogenation method with successive separations and desulphurizing hydrogenations of heavy and light fractional parts.

Fig. 11 is a diagrammatic view of a plant for the execution of the method according to Figs. 10 and 11.

According to Figs. 1 and 2, the vapours to be hydrogenated enter at I in a set of vertical or horizontal tubes 2 containing the catalyzing substance, and these alternate with tubes 3 containing absorbent masses; the gas issues at 4. When the absorbent masses are saturated with sulphur, it is required to replace them by fresh products. In the plant shown in Fig. 2, the absorbent masses may be subjected to a desulphurizing treatment, as above stated, by means of desulphurizing gases introduced at 5. The apparatus are provided with a bottom discharge at 6. In the embodiments shown in Figs. 1 and 2, the substitution or the regeneration of the absorbent masses will require a momentary stopping of the plant, which is most prejudicial to the life of the catalysts.

The devices represented in Figs. 3 and 4 obviate this drawback; each absorbent mass is distributed among several tubes $3^a$, $3^b$ which are alternately put in service for absorption and for re-charging (Fig. 3), or for renewal (Fig. 4), by means of a circuit 5, 6 for the desulphurizing gas. The operation is performed by means of valves, the control of which may be made automatic by means of an apparatus of a known type based upon the principle of analysis of gases, mounted at the outlet of the absorbers, or by any other suitable means. As such arrangements are well known to persons skilled in the art, they have not been represented in the drawings.

If the absorbent substances employed should have an activity such that they will reduce, to too small a value, the proportion of hydrogen sulphide, the desired proportion in the vapours may again be established, either by mounting, between the absorption chambers and the catalysis chambers, a receptacle 7 containing a reducible sulphide which is suitably chosen (Fig. 5) (such as sulphide of copper or of antimony, for instance) and provided with a by-pass 8 comprising a cock 9, or by connecting to the outlet of the absorption chambers 3 and to the inlet of the catalysis chambers 2 an auxiliary supply of hydrogen sulphide 10 (Fig. 6), or by lowering the temperature of the absorption chambers, or by passing the vapours through several absorption chambers containing different substances or the same substance in different states of saturation (which method is applicable chiefly with the apparatuses shown in Figs. 3 and 4), or by using an adjustable branch 11 with each absorption chamber (Fig. 7). The control of the regulating of these different devices may be made automatic as above stated, or by any other means.

Each apparatus may comprise an indefinite number of absorbing tubes and catalysis tubes, and may be provided with one or more heat-exchanging devices 12 (Fig. 8).

The heat required for the heating is supplied either by electric heating, or by hot gases, or by means of reactions of absorption, as above set forth. For this purpose, one or more absorption chambers $3^c$ (Fig. 8) may be mounted, in the form of a heat-exchanging device, in the circuit of the gases and vapours before they proceed into the first catalysis chamber.

The following example shows the practical application of the invention, but without limiting its scope.

The hydrogenation of a schist-oil has been effected with a molybdic catalyst prepared as above explained.

Pressure: 1 atmosphere, absolute.
Temperature: 450° centigrade.
Proportion of sulphur in the initial product: 4%.
Boiling point of the initial product: 120° to 220° C.

A single hydrogenation with the catalyst alone afforded a product containing 2% of sulphur, and having a boiling point comprised between 100° and 210° C.

Successive partial hydrogenations with the same catalyst, when using masses which absorb hydrogen sulphide in conformity with the invention afforded a product containing 0.04% of sulphur and having a boiling point comprised between 50° and 165° C.

As already mentioned above, by using the desulphurizing hydrogenation according to the invention, it is possible to effect the hydrogenation of carbonaceous material by successive separations and desulphurizing hydrogenations of heavy and light fractional parts. In conformity with the diagram, figure 9, the method is supposed to be applied to a crude oil 21. This oil is separated at 22 by distillation and by fractional condensation into one or more fractional parts, which are light, such as 23, or are heavy such as 24, with usually a residue of tar 25 which is not treated.

A separate hydrogenation is then effected at low pressure (stages 26 and 27 of the method). This hydrogenation at low pressure is a desulphurizing hydrogenation, the sole object of which is the elimination of the sulphuretted impurities of the oils. It may be effected irrespectively of the proportion of sulphur in the oil under treatment, at a pressure comprised between 10 and 50 atmospheres, and in the presence of an excess of hydrogen of about 50% to 100% of the hydrogen which is theoretically required, whereas if the hydrogen sulphide is not eliminated, it is necessary, in order to obtain the same result, to operate in the presence of an excess of hydrogen which is much greater (10 to 100 times more), and at pressures of the order of 150 to 250 atmospheres per square centimetre.

Owing to the desulphurizing hydrogenation at 26, the light fraction or fractions 23 are entirely purified.

As to the heavy fraction or fractions 24, they are greatly desulphurized (for example, 80% to 90% of the sulphur and the oxygen are eliminated) and are partially transformed into light hydrocarbons (40% to 50% for example).

The desulphurizing hydrogenation is in fact always accompanied by a lightening of the original oil. This is due to the transformation of the heavy sulphuretted compounds into equivalent hydrocarbons which boil at much lower temperatures (for example, thiophene, $C_4H_4S$, the boiling point of which is 84° C., gives by hydrogenation, $C_4H_{10}$, the boiling point of which is only $+1°$ C.; dimethyl-thiophene, the boiling point of which is 136° C., gives a hexene which boils at 69° C.). The transformation of non-saturated compounds, and of impurities which are oxygenated and nitrogenous, into equivalent saturated hydrocarbons, which always accompanies the desulphurisation, is also a cause of the lightening of the oil.

It will result that after the hydrogenation, at 27, of the heavy fractional parts 24, there is formed a mixture of new light fractional parts and of heavy fractional parts which are to be subjected to the succeeding hydrogenation or hydrogenations at high pressure.

However, if it is thus desired to pursue the hydrogenation, under pressure, of the heavy hydrocarbons of the oil up to the formation of light hydrocarbons, such as petrols, the applicant has observed that it is indispensable that the oil should be entirely free from light fractional parts (final boiling point at 200°, for example), as these will not resist the conditions required for the lightening of the heavy products, and will be partly transformed into gas.

It is thus indispensable to separate the light portion produced during the desulphurizing hydrogenation at 27, before subjecting the heavy products which remain, to the lightening treatment at high pressure.

This separation is effected, for instance, by a distillation at 28. This distillation affords light products 29 and heavy products 30.

Such products 30 are subjected to a desulphurizing hydrogenation at high pressure (stage 31 of the method).

The advantage of the desulphurizing hydrogenation is also apparent in this case which corresponds to the transformation of heavy oils which are slightly sulphuretted, into light hydrocarbons. In fact, it is advantageous to operate at a high pressure, comprised between 50 and 250 atmospheres, or more, the excess of hydrocarbon employed may then be reduced to 50% or 100% of the hydrogen which is theoretically required, whereas if the desulphurizing hydrogenation is not employed, it is necessary, to obtain the same result, to employ an excess of hydrogen which is much greater and which in fact depends upon the proportion of sulphur in the oil under treatment. On the contrary, when using the desulphurizing hydrogenation, the pressure and the excess of hydrogen to be employed for effecting the lightening hydrogenation are quite independent of the amount of sulphur in the oil under treatment, provided the apparatus or apparatuses in use, which are constructed according to the aforesaid principles, comprise a sufficient number of chambers. After the treatment at 31, which is as a rule left incomplete in order to prevent an excessive formation of gas, a part of the heavy oil under treatment (50% to 80% for example), is transformed into light petrols. One proceeds with another separation at 32 by distillation, by fractional condensations, etc., which afford light oils at 33 and heavy oils at 34. The separation at 32 can be effected under pressure, directly at the outlet of the apparatuses used for hydrogenation, or eventually, after a total or partial expansion.

Eventually, the heavy part 34 which is separated as above mentioned, may be again hydrogenated at high pressure for instance, it being mixed with the heavy oil located at 30.

It now remains to purify the light fractions such as 29; 33 . . . . . resulting from the successive desulphurizing hydrogenations of the heavy fractional parts. In fact, a long as the desulphurizing of a crude oil is not entirely complete, the light parts (the final boiling point of which is 200° C. for example) which are separated by distilling after hydrogenation, are never quite free from impurities such as traces of sulphur, oxygen, nitrogen. In other words, the exact purification by hydrogenation is not economically possible if the petrol under treatment contains a heavy part (which remains heavy during the treatment) and which contains the same impurities as the petrol to be purified. The reason for this experimental fact appears to be that the reactions employed are never specific nor complete. For this reason, the heavy products which are sulphuretted, oxygenated or nitrogenous, instead of being transformed into equivalent hydrocarbons and $H_2S$, $H_2O$ and $NH_3$ respectively, are for a small part transformed into light compounds which are sulphuretted, oxygenated or nitrogenous and which then accompany the petrols which are produced. Such petrols must therefore be subjected to a final purification which can be effected either by chemical means (washing) or by physical means (adsorption), or preferably by means of a further hydrogenation at low pressure. The purifying hydrogenation, which is made possible by the elimination of the heavy hydrocarbons by distillation, has the advantage of supplying a petrol which is refined to such a degree that the impurities cannot be practically estimated.

The purifying hydrogenation may be applied either to the aforesaid light parts alone (stages 35 and 36; Fig. 9), or by mixture with the light parts separated at 26 (Fig. 10) (stage 37, Fig. 10), or otherwise, with these latter parts which have been already partially hydrogenated, in such way as to effect a powerful hydrogenation of the whole of the light petrols. Again, this purifying hydrogenation may be effected in such manner that it will also be destructive, and will furnish petrols which are quite anti-detonating.

The principal advantages of the method of hydrogenation according to the invention are as follows:

The purification of the light portions, and the transformation into light hydrocarbons, of a part of the heavy fractions, are effected at low pressure. Thus the plant is less expensive, and the expense for compression is reduced. As the part of the apparatus which operates at high pressure only treats a fourth or a fifth of the crude oil, it is thus of a very reduced size.

As the quantities of hydrogen employed are very small, the expense for compression is much less, and the consumption of hydrogen is often reduced.

The said process also affords various secondary advantages, such as a reduced size, less upkeep, increased safety, and chiefly a great responsiveness, and a considerable output for the plant, as each part may be exactly adapted to the sole operation which it is to perform (a greatly reduced production of gaseous hydrocarbons for instance).

Fig. 11 represents diagrammatically a plant adapted for the said method.

According to this embodiment, a crude schist-oil (containing 5% of S) is first fractionated by distillation into a light part (final boiling point 200°) which represents 35% of the total and contains 5% of S, into a heavy part (boiling point between 200° and 400°) which represents 60% of the total and contains 4.8% of S, and into a residual tar (5%) which will not be treated.

The light oil, which is compressed to some 40 kgs. per sq. cm. by a pump 38, and is then mixed with the hydrogen (0.250 cu. m. per litre of light oil) circulates through an apparatus for desulphurizing hydrogenation, 26, and then through an apparatus for final purification, 37, from which it issues entirely free from all impurities.

The heavy oil which is compressed at about 40 kgs. per sq. cm. by a pump 39 and is then mixed with hydrogen (0.250 cu. m. per litre of oil) passes through an apparatus for desulphurizing hydrogenation, 27, in which its total proportion of sulphur is reduced from 4.8% to 0.7%, after which, in a partly condensed state, it passes into the fractionating column under pressure 28. It is then separated into a light fraction (40% of the oil) containing 0.2% to 0.4% of sulphur, and a heavy fraction (60% of the oil) containing about 1% of sulphur.

This latter is taken from the lower part of the column 28 by a pump 40, and is brought to 200 atmospheres, and it is then mixed with hydrogen supplied by a compressor 41 (0.300 cu. m. of $H_2$ per litre of oil); it then passes through the apparatus adapted for hydrogenation and for lightening, 31, and from this latter, after an expansion to about 40 atmospheres by means of a valve 46, it is delivered into the column 28, in which it is separated into 75% of a light fraction containing 0.1% of sulphur, and 25% of a heavy fraction containing 0.4% of sulphur. This latter fraction is circulated indefinitely in the apparatus 31 until it is entirely transformed into light petrols.

The light portions which are separated in the column 28 are drawn forward, in the state of vapour, for the unconsumed hydrogen, towards the apparatus for the purifying hydrogenation, 37, in which they are subjected to the final purification, together with the light portions extracted from the crude oil by distillation. The purified vapours are condensed by a refrigerating apparatus 42, and are separated at 43. The petrol is directly withdrawn at 44, and the unconsumed hydrogen is continually put in circulation by a compressor 45 which supplies it to the apparatuses 26 and 27.

The apparatuses 26 and 27, 31 and 37 are constructed according to the principles above set forth, that is to say, they comprise, either combined or alternated, chambers for catalysis and chambers for the absorption of the hydrogen sulphide which is formed.

By the use of the aforesaid plant, 1000 litres of schist oil which were treated, furnished 1000 to 1050 litres of petrol which was quite free from impurities. The production of methane is less than 1%.

Obviously, the invention is not limited to the embodiments represented and described, which have been chosen only by way of example.

In particular, the figures given in the preceding example and in the entire description of the invention (chiefly those relating to pressures, outputs of hydrogen, etc.) are mentioned only for illustration.

It is further possible not to use the desulphurizing hydrogenation for all stages of the method, but only for one or more of these latter, but without, for this reason, departing from the limits of the present invention.

Having now described my invention what I claim as new and desire to secure by Letters Patent is:

A method for the hydrogenation of carbonaceous material containing sulphur which consists in effecting said hydrogenation with hydrogen containing gases in the presence of a hydrogenating catalyst adapted to transform carbonaceous compounds into carbonaceous products having a lower boiling point, and subjecting the mixture of hydrogen containing gases and carbonaceous material during said hydrogenation to the action of an absorbing substance adapted to absorb hydrogen sulphide, so as to maintain constantly the hydrogen sulphide content of said mixture between 0.1% and 1%.

PAUL MARÉCAUX.